US008599260B1

(12) United States Patent
Vaughn

(10) Patent No.: US 8,599,260 B1
(45) Date of Patent: Dec. 3, 2013

(54) SCHOOL BUS TRAFFIC ARM CAMERA SYSTEM

(71) Applicant: Zen-tinel, Inc., Indiana, PA (US)

(72) Inventor: Larry Vaughn, Indiana, PA (US)

(73) Assignee: Zen-Tinel, Inc., Indiana, PA (US)

( * ) Notice: Subject to any disclaimer, the term of this patent is extended or adjusted under 35 U.S.C. 154(b) by 0 days.

(21) Appl. No.: 13/633,481

(22) Filed: Oct. 2, 2012

Related U.S. Application Data

(60) Provisional application No. 61/659,016, filed on Jun. 13, 2012.

(51) Int. Cl.
*H04N 7/18* (2006.01)
*G08G 1/04* (2006.01)

(52) U.S. Cl.
CPC ........................................ *G08G 1/04* (2013.01)
USPC .......................................................... 348/149

(58) Field of Classification Search
None
See application file for complete search history.

(56) References Cited

U.S. PATENT DOCUMENTS 5,027,200 A * 6/1991 Petrossian et al. ............ 348/118
5,382,953 A * 1/1995 Hauptli ......................... 340/937
5,510,764 A * 4/1996 Hauptli ......................... 340/433
5,793,420 A * 8/1998 Schmidt ........................ 348/148
5,946,404 A * 8/1999 Bakshi et al. ................. 382/103
6,738,089 B1 5/2004 Sile
7,812,711 B2 10/2010 Brown et al.
8,004,394 B2 * 8/2011 Englander ..................... 340/433
8,120,653 B2 * 2/2012 Schmidt et al. ............... 348/118
2009/0149111 A1 * 6/2009 Scherba ........................ 446/220
2009/0195651 A1 8/2009 Leonard et al.
2010/0225738 A1 * 9/2010 Webster .......................... 348/36

FOREIGN PATENT DOCUMENTS

CA 2734223 3/2011

* cited by examiner

*Primary Examiner* — Nhon Diep
(74) *Attorney, Agent, or Firm* — Luedeka Neely Group, PC

(57) ABSTRACT

A system for capturing images of a vehicle violating an extended stop arm of a school bus. The system includes a housing, a base plate for the housing, a system actuation device, and a mounting plate. The system comprises the following components disposed between the base plate and the housing: (i) at least a first camera for capturing an image of a license plate of a vehicle passing the school bus; (ii) a storage device for recording images from the first camera; and (iii) a power source for operating the camera and storage device. The mounting plate is attached to the school bus, and the base plate and housing are removably attached to the mounting plate without the need for permanently attaching the system to the school bus.

24 Claims, 11 Drawing Sheets

SCHOOL BUS TRAFFIC ARM CAMERA SYSTEM

CROSS REFERENCE TO RELATED APPLICATION

This application claims the benefit of U.S. Provisional Application No. 61/659,016, filed Jun. 13, 2012.

FIELD

This invention relates to the field of traffic camera recording systems. More particularly, this invention relates to a portable stop arm actuated traffic recording system for recording license plate and other vehicle information in order to improve safety.

BACKGROUND AND SUMMARY

School buses generally include a stop arm that extends from the side of the school bus when a school bus is stopping to alert passing drivers that the bus is loading and unloading passengers. The stop arm generally includes a stop sign mounted on the end of an arm that extends the stop sign whenever the bus stops to load and unload passengers.

Despite the stop signs and flashing lights, motorists frequently fail to stop when a school bus deploys the stop arm thereby endangering the lives of those boarding and departing the bus. While citations may be issued against drivers that fail to stop for an extended stop arm of a school bus, it is difficult to capture identifying information of the vehicle failing to stop for an extended stop arm, when no officer or other official is present to record the incident. Recent surveys indicate there are approximately 80,000 to 150,000 violations per day of drivers failing to stop for school busses.

Further, typical surveillance systems that are currently used, are relatively expensive and therefore it may not be practical to install such a system on every bus of an entire fleet. Additionally, currently available surveillance systems may be difficult to install and are typically permanently mounted so that the systems are not easily movable from one bus to another.

Therefore there is a need for a portable stop arm camera system for capturing images of vehicles and a license plate of the vehicles failing to stop for an extended stop arm. In view of the above, one or more aspects of the invention disclosed herein fulfill the aforementioned and other needs by providing a school bus portable stop arm traffic camera image capture and recording system.

In a first aspect, the present disclosure provides a school bus portable stop arm traffic camera system comprising: a housing, a base plate for the housing, a system actuation device in electrical communication with components in the housing, and a mounting plate for attaching the housing and base plate to a side of a school bus. The system comprises the following components disposed in the housing between the base plate and housing: (i) at least a first camera for capturing an image of a license plate of a vehicle passing the school bus; (ii) a storage device for recording images from the first camera; and (iii) a power source for operating the camera and storage device. The mounting plate is attached to the school bus, and the base plate and housing are removably attached to the mounting plate without a need for permanently attaching the system to the school bus.

In some embodiments, the first camera captures an image of a license plate of a vehicle passing from the front of the bus. The stop arm camera system further includes a second camera for capturing an image of a license plate of a vehicle passing from the back of the bus and a third camera for capturing an image of a driver of the vehicle, wherein at least one of the first, second and third cameras also captures at least a portion of an extended stop arm of the bus.

In certain embodiments, the system activation device comprises a camera(s) activation device, wherein the first, second and third cameras begin recording when the stop arm of the bus is extended.

In some embodiments, the stop arm traffic camera system comprises a motion sensor for creating an event indicating when the first, second and third cameras record an image of a license plate of a vehicle passing the school bus while the stop arm is extended.

In certain embodiments, the first camera captures an image of a license plate of a vehicle passing from the front of the bus and a portion of an extended stop arm of the school bus.

In other embodiments, the stop arm traffic camera system further comprises a GPS unit for recording the location of the school bus when the first, second and third cameras capture images of a license plate of a vehicle.

In some embodiments, the stop arm camera system further comprises an access door on a side portion of the housing for removing the storage device to retrieve images recorded by the stop arm camera system and for accessing a power source of the stop arm camera system.

In certain embodiments, the stop arm camera system further comprises a power source for powering the system, wherein the power source is independent from and not connected to the school bus, the power source selected from the group consisting of a rechargeable battery, a solar power source, and combinations thereof.

In another embodiment, the stop arm camera system further comprises a power cable in electrical communication with the school wherein the stop arm camera system is powered by the school bus.

In some embodiments, the base plate and mounting plate contain a locking device for securing the base plate of the system to the mounting plate.

In certain embodiments, the base plate is slidably engaged with the mounting plate. In other embodiments, the base plate is rotatively engaged with the mounting plate. In some embodiments, the mounting plate is magnetically attached to a side portion of the school bus.

In a second aspect, the present disclosure provides a method of attaching a camera system to a school bus, wherein the camera system includes (a) a mounting plate containing engaging means and locking means, (b) a housing containing a camera system for recording stop arm violations and a base plate for engaging the engaging means and locking means of the mounting plate, and (c) activation means for activating the camera system. The method includes removably attaching the camera system housing to the mounting plate of a school bus and locking the housing onto the mounting plate.

In some embodiments, the system further comprises a motion sensor for creating an event indicating when the first, second and third cameras record an image of a license plate of a vehicle passing the school bus while the stop arm is extended.

In other embodiments, the system includes power means for powering the system, wherein the power means is independent from and not in electrical communication with the school bus, the power means being selected from the group consisting of a rechargeable battery, a solar power source, and combinations thereof.

An advantage of the system and method described herein is that a substantially portable system can be used on a fleet of busses without the expense of having the system mounted on all of the busses in the fleet at the same time. Another advantage is that the system enables rapid identification, including the license plate, make and model of vehicle, and driver identification of violators thereby improving the safety of passengers riding the buses. A more complete appreciation of the present disclosure and its scope can be obtained from the following description of the invention.

BRIEF DESCRIPTION OF THE DRAWINGS

The embodiments may best be understood by reference to the attached drawings in which.

DETAILED DESCRIPTION OF THE INVENTION

Figure 1:
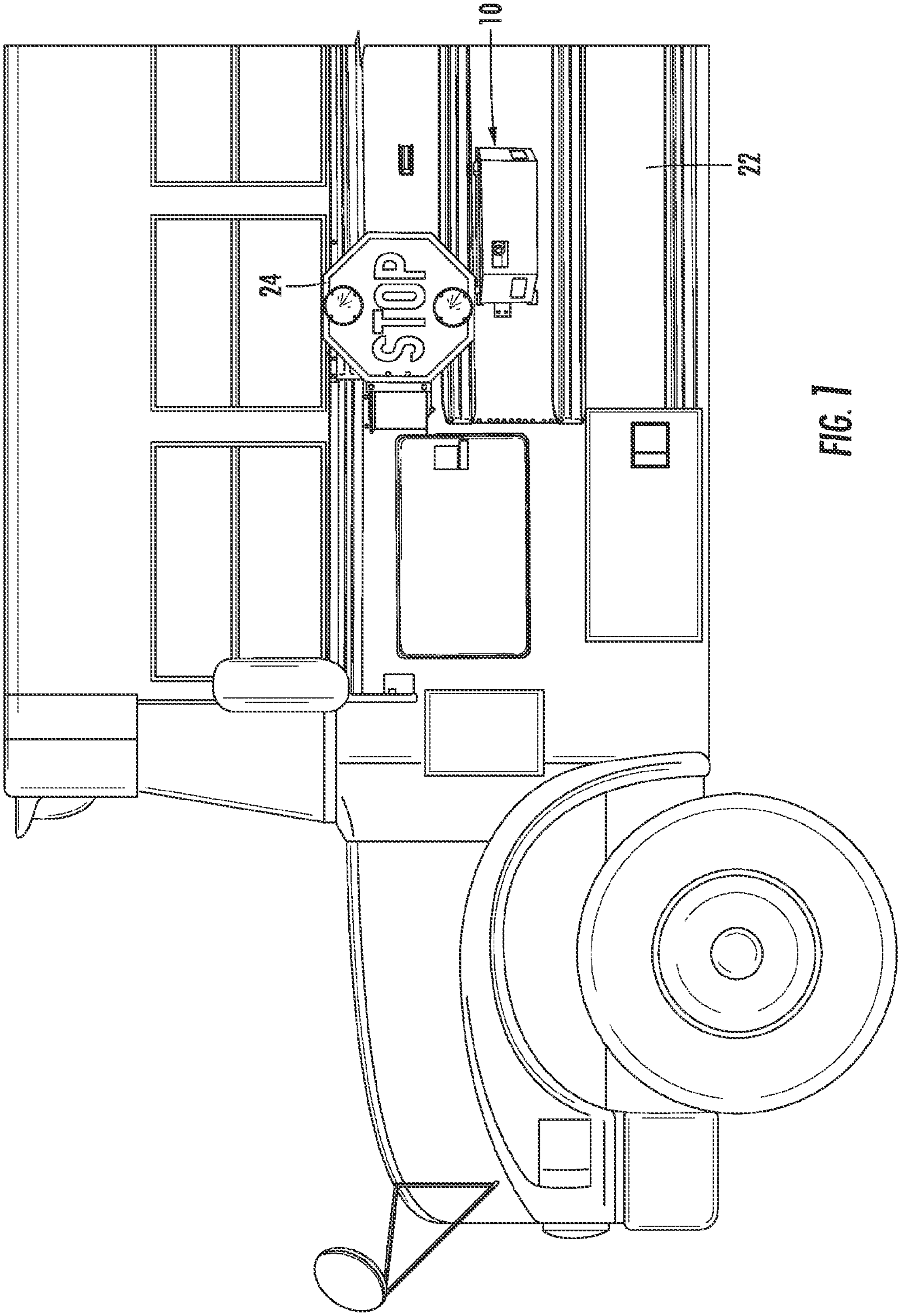
FIG. 1 is a perspective view of a stop arm camera system attached to a school bus according to one embodiment of the present disclosure.

The present disclosure provides a portable camera system 10 for detecting traffic violations. In particular, the portable camera system 10 includes one or more self-contained stop arm cameras and a recorder for documenting violations of a bus stop arm. The portable system 10 includes a housing 12, at least a first camera 14, second camera 16 and third camera 18, and a storage device 20 for recording stop arm violations. The portable camera system 10 is configured such that the camera system 10 is readily movable between multiple buses.

FIG. 1 depicts a portable system 10 according to the present disclosure removably mounted on a school bus 22 having a stop arm 24, wherein the stop arm 24 is activated when the school bus 22 comes to a stop and picks up or drops off passengers. When the school bus comes to a stop to pick up and drop off passengers, the stop arm 24 is extended to signal passing drivers that passengers are boarding and debarking the bus.

Figure 2:
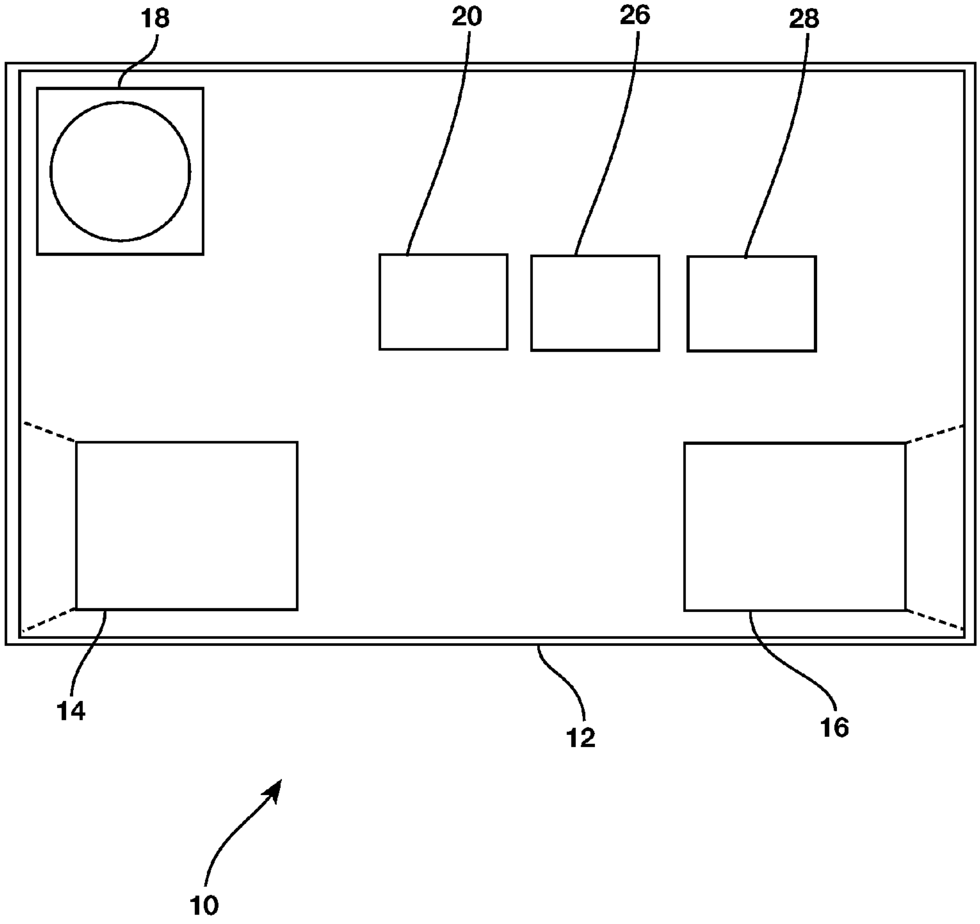
FIG. 2 is a schematic view of a stop arm camera system according to one embodiment of the present disclosure.

In a first aspect, depicted in FIG. 2, the present disclosure provides a portable stop arm camera system 10 for documenting violations of a stop arm that includes a housing 12, a first camera 14, a second camera 16, a third camera 18, and a storage device 20. The first camera 14, second camera 16, third camera 18, and storage device 20 are located within the housing 12 such that the system is substantially portable and easily movable from one bus 22 to another. While a three-camera system is described and illustrated, it will be appreciated that the number of cameras is variable and may range from 1 to 4 or more depending on the views required to adequately show when a violation takes place. For most situations, three cameras are typically sufficient to verify that a violation has taken place and to provide identification of the violator.

Figure 3:
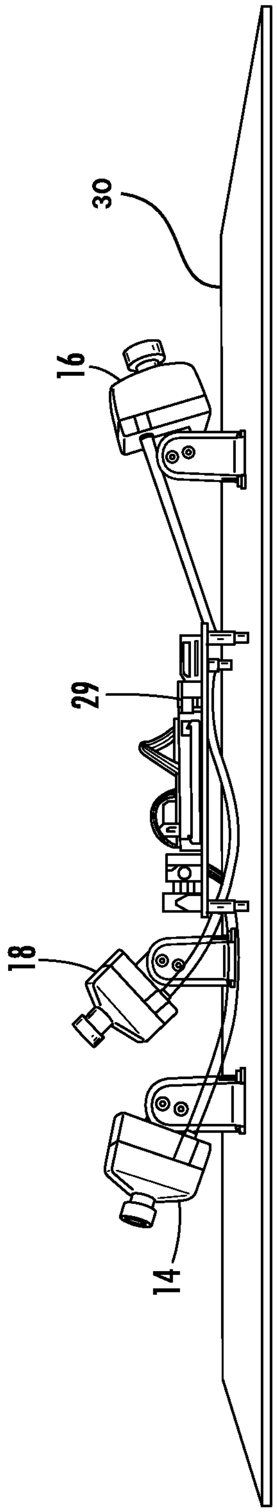
FIG. 3 is a side view of a stop arm camera system according to one embodiment of the present disclosure.

The first camera 14 is located within the housing 12 and is positioned such that the first camera 14 captures an image of a license plate of a vehicle passing from the front of the bus 22 that includes a view of a stop arm 24 of the bus 22 to show the vehicle passing the portable stop arm camera system 10. Alternatively, the first camera 14 may capture an image of a license plate of a vehicle passing the portable stop arm camera system 10 if a vehicle is passing the bus 22 in the same direction of travel as the bus. The second camera 16 is also located within the housing 12 and is positioned such that the second camera 16 captures an image of a license plate of a vehicle passing from the rear of the bus 22. Alternatively, the second camera 16 may capture an image of a license plate of a vehicle passing the portable stop arm camera system 10 if a vehicle is passing the bus 22 in a direction of travel opposite that of the bus. The third camera 18 is also located within the housing 12 and is positioned such that the third camera 18 may capture a view of a driver of a vehicle passing the stop arm camera system 10. As shown in FIG. 3, the angle of the first camera 14, second camera 16 and third camera 18 varies according to the image desired to be captured by each individual camera.

In one embodiment, the first camera 14, second camera 16, and third camera 18 may have varying lens sizes depending on the view desired to be captured by the particular camera. For example, the first camera may have a 16-millimeter lens for capturing a somewhat broad view that includes both the front of a vehicle passing the stop arm camera system 10 and a view of the extended stop arm 24. The second camera 16 may have a 25-millimeter lens for capturing a close up view of a rear license plate of a vehicle passing the stop arm camera system 10. The third camera 118 may have a 6-millimeter lens for capturing a broad view of a vehicle passing the stop arm camera system 10 that includes a view of the face of a driver of the vehicle passing the stop arm camera system 10. Such cameras are readily available. In other embodiments, low light cameras and cameras with polarized lenses may be used to obtain higher resolution images in low light or other situations. The circuit boards for capturing and recording incidents are also readily available and may be adapted for use with the system.

In another embodiment, the first camera 14, second camera 16, and third camera 18 may be configured to record in low-light environments, such that the portable stop arm camera system 10 is able to record images during early morning and late evening bus runs. In one embodiment, the portable stop arm camera system 10 may include a flash or other light source, such as LED or strobe lights, for illuminating an area for recording by the first, second and third cameras.

In another embodiment, the portable stop arm camera system 10 may further include a fourth camera for recording a fourth view of a vehicle passing the portable stop arm camera system 10 and bus 22. The fourth camera may be used for capturing vehicles passing the bus on a roadway of four or more lanes. In another embodiment, the system may be adapted for capturing a vehicle passing the stop arm camera system when the vehicle is moving in the same direction as the bus on a three or four lane roadway. The system may also be adapted to capturing images of the area for assisting in identifying where the violation took place and for documenting weather and other conditions during the violation incident.

With further reference to FIG. 2, the portable stop arm camera system 10 includes a storage device 20 for recording images from the first camera 14, second camera 16, and third camera 18. The storage device 20 may be comprised of a compact flash card, secure digital card, portable hard drive, magnetic tape, or other suitable storage mediums for storing digital information. The storage device 20 for recording violations may be removably attached to a circuit board 29 for controlling the cameras and storage device.

The stop arm camera system 10 may further include a communications component 26 for transmitting data recorded on the storage device 20 including images and location information. In one embodiment, data recorded on the stop arm camera system 10 is downloaded to a computer terminal after the bus 22 has completed a designated route and a stop arm violation was recorded. Alternatively, the communications component 26 may enable wireless transmission of data on the storage device 20. The data may be wirelessly transmitted to a remote server where a user may then access the transmitted data. In one embodiment, recordings on the stop arm camera system 10 are only downloaded if a stop arm violation is recorded. In this embodiment, the recordings may be automatically transmitted to a remote server as soon as a violation is detected. Alternatively, the stop arm camera system 10 may automatically transmit the recording if any violations are detected when the bus completes the designated route.

In another embodiment, the portable stop arm camera system 10 further includes a GPS unit 28. The GPS unit 28 records the position of the bus when the stop arm camera system 100 activates and therefore provides location information for a violation of the stop arm. The GPS unit 28 continuously monitors the location of the bus while the stop arm camera system 10 is activated. When a stop arm violation is detected, the location of the bus may be stamped on the information recorded from various cameras of the stop arm camera system 10. The stamped information includes GPS coordinates of where a stop arm violation was detected.

Figure 4:
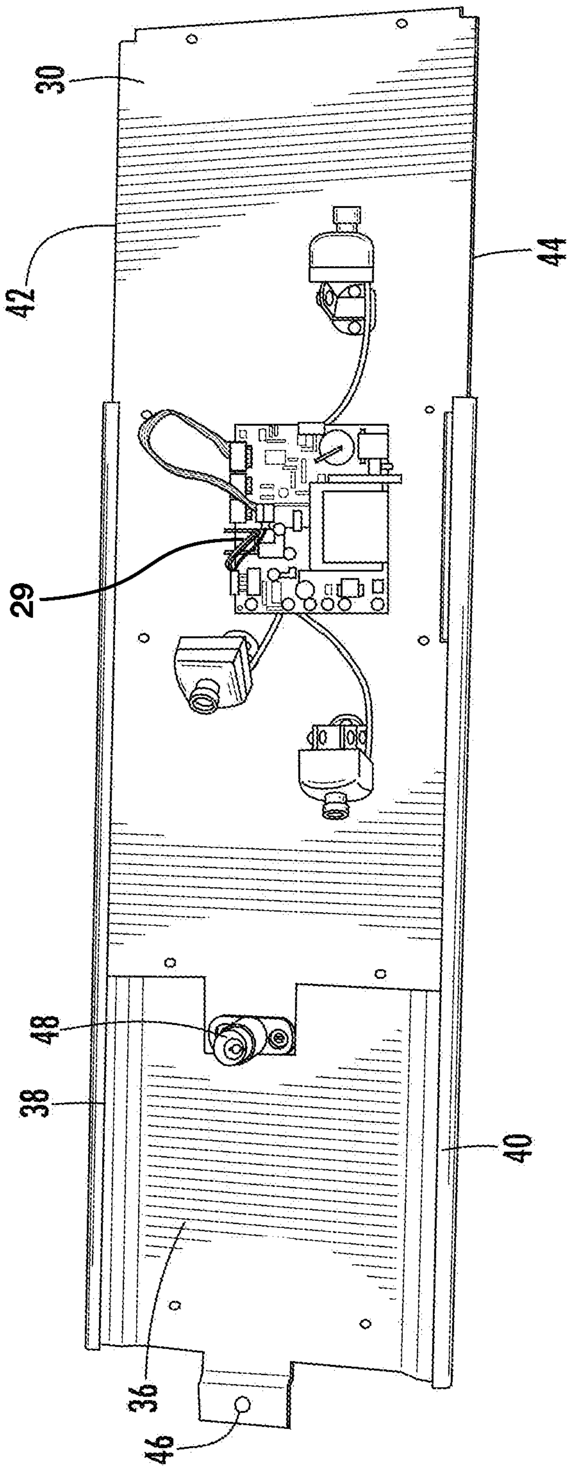
FIG. 4 is a top perspective view of a stop arm camera system according to one embodiment of the present disclosure.

Each of the cameras 14, 16, and 18, the storage device 20, the communications component 26 and the GPS unit 28 are in electrical communication with the circuit board 29 for controlling the function of each of the devices. In one embodiment, the first camera 14, second camera 16, third camera 18, storage device 20, communications component 26 and circuit board 29 are secured to a base plate 30 as shown in FIGS. 3 and 4.

Figure 5:
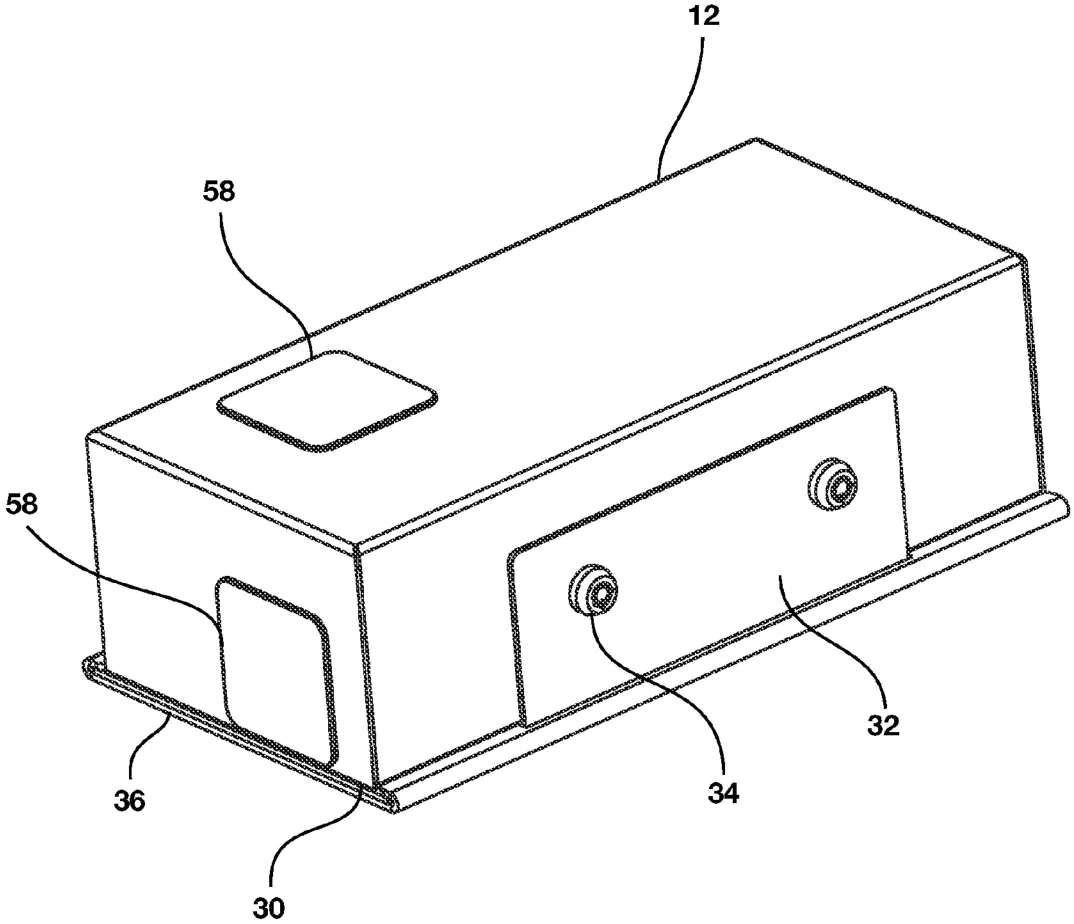
FIG. 5 is a perspective view of a stop arm camera system housing according to one embodiment of the present disclosure.

The various components of the portable stop arm camera system 10 attached to the base plate 30 are enclosed within a housing 12 secured to the base plate 30, shown in FIG. 5. The housing 12 is constructed of a rigid material such as metal or durable polymeric materials and provides a secure unit to house the components of the portable stop arm camera system 10. A waterproof gasket may be provided for placement between the housing 12 and the base plate 30 to prevent moisture from entering the housing 12.

The housing also includes one or more windows 58 for protecting the first camera 14, second camera 16, and third camera 18. Further, the housing 10 may be substantially weatherproof for protecting the components of the stop arm camera system 10. In one embodiment, the one or more windows 58 may be polarized.

The housing 12 further includes an access door 32 located on a side portion of the housing 12. The access door 32 is removable to allow ready access to the storage device 20 located within the housing 12. Further, the access door 32 may provide access to a rechargeable battery located within the housing 12 such that the rechargeable battery may be charged without removing the battery from the housing 12. In some embodiments, the access door 32 includes an access door lock 34 for preventing the access door 32 from being opened and thereby preventing unauthorized removal of the storage device 20 or other internal components from the stop arm camera system 10.

Figure 6:
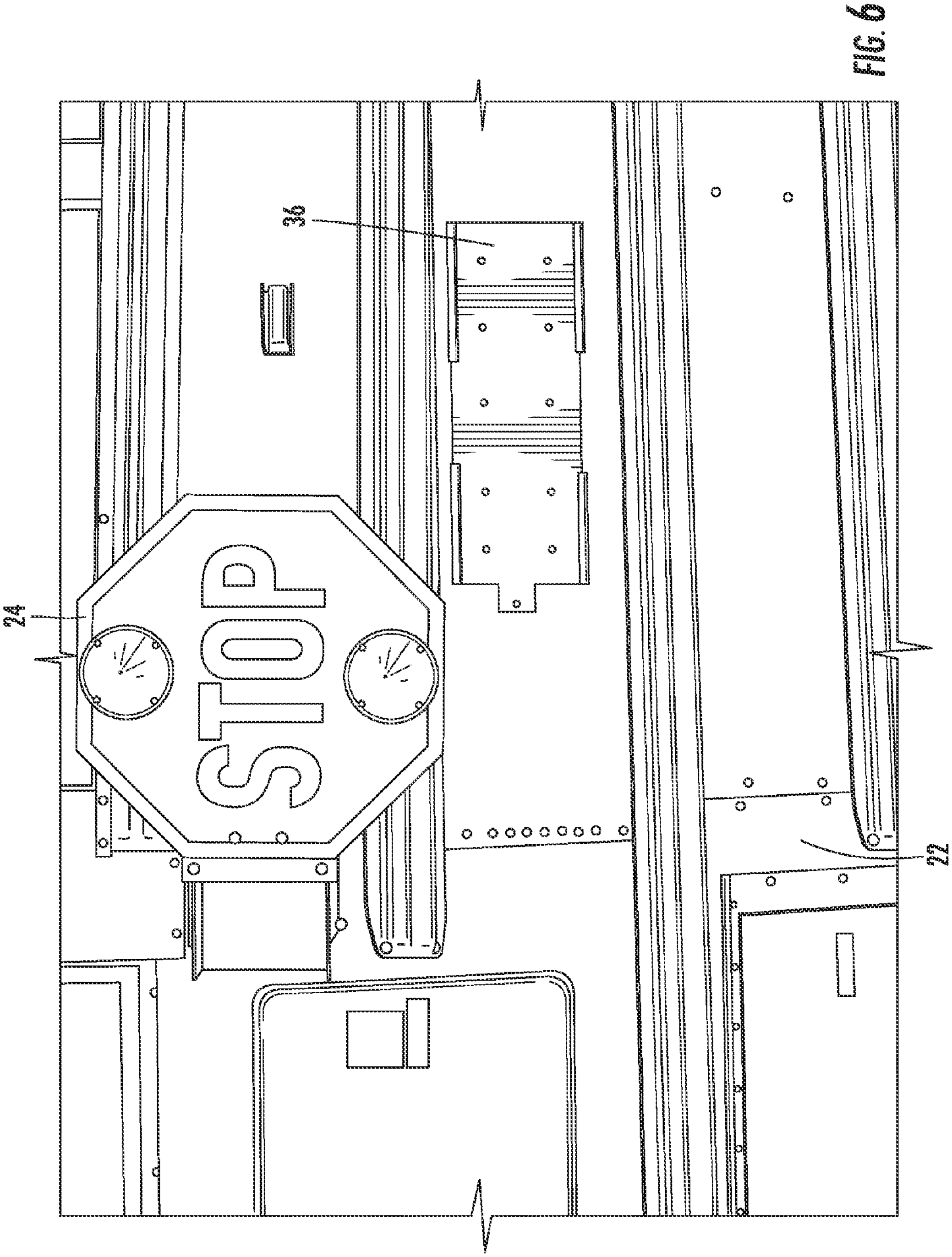
FIG. 6 is a perspective view of a mounting plate of a stop arm camera system according to one embodiment of the present disclosure.

Referring to FIG. 4, the stop arm camera system 10 further includes a mounting plate 36 for removably securing the stop arm camera system 10 to a bus 22. The mounting plate 36 may be installed to the exterior of the bus 22 adjacent the stop arm 24 (FIG. 6). The mounting plate 36 is configured to receive the base plate 30 and housing 12 secured thereto to enable the housing 12 and base plate 30 to be easily installed and removed from the mounting plate 36.

The mounting plate 36 includes a first channel 38 and a second channel 40 for engaging a first edge 42 and a second edge 44 of the base plate 30. The mounting plate 36 further includes a locking aperture 46 for receiving a base plate lock 48 mounted to the base plate 30. When the base plate 30 has been fully engaged with the mounting plate 36 the base plate lock 48 is substantially aligned with the locking aperture 46 of the mounting plate 36. The base plate 30 may be substantially secured to the mounting plate 36 with the base plate lock 48 once the base plate lock 48 and locking aperture 46 are substantially aligned, thereby preventing theft of the stop arm camera system 10. While FIG. 4 illustrates the base plate lock 48 being attached to the base plate 30 for engaging a locking aperture 46 of the mounting plate 36, it is also understood that the base plate lock 48 may be attached to the mounting plate 36 for engaging the base plate 30. Likewise, it is also understood that various other locking mechanisms may be used to prevent the base plate 30 from being slidably removed from the mounting plate 36. In another embodiment, the mounting plate 36 may have a single channel or other configuration for engaging only a single edge of the base plate 30 so that the stop arm camera system 10 may be rotatively engaged with the mounting plate 36 rather than slidably engaged with the mounting plate 36. One or more base plate locks 48 may be used to secure the stop arm camera system 10 to the bus.

In one embodiment, the mounting plate 36 may be permanently wired to the power supply of the bus 22. The stop arm camera system 10 may receive power from the mounting plate 36 when the base plate 30 and housing 12 containing the components of the stop arm camera system 10 is secured to the mounting plate 36. In another embodiment, the stop arm camera system 10 may include a rechargeable battery within the housing 12 thereby allowing the stop arm camera system 10 to be self-powered and easily installed on multiple buses. In other embodiments, a solar panel may be included on the housing 12 for the stop arm camera system to recharge the rechargeable battery and/or provide power for operating the portable system 10.

In yet another embodiment, the stop arm camera system 10 is powered by the bus 22. A removable power connector, such as a commonly available trailer light plug and receiver, may be used to power the stop arm camera system. A receiver may be installed adjacent the mounting plate of the stop arm camera system 10. The stop arm camera system 10 includes a cable with a plug that is inserted into the receiver for powering the stop arm camera system. Multiple receivers may be installed on multiple buses such that a stop arm camera system 10 having a plug may be installed on any of the buses having a receiver. The stop arm camera system 10 is further in electrical communication with the school bus such that the one or more cameras begin recording when hazard or flashing lights of the bus are activated indicating the picking up or dropping off of passengers.

In another embodiment, the portable stop arm camera system 10 may be secured to the exterior of a school bus using one or more magnets. The one or more magnets may be located between the base plate and an exterior surface of the school bus, thereby securing the stop arm camera system 10 to the bus while allowing the stop arm camera system 10 to be easily removed and ported from one school bus to another.

By allowing the base plate 30 and housing 12 secured thereto to be easily removed and installed on the mounting plate 36, multiple mounting plates 36 may be installed on multiple buses 22, allowing the housing 12 and recording components within the housing 12 to be easily moved from one bus to another. For example, mounting plates 36 may be installed on an entire fleet of buses 22 such that if one bus 22 encounters a route that typically includes frequent stop arm violations, the portable stop arm camera system 10 may be installed on that bus such that the violators of the stop arm may be recorded using the stop arm camera system 10 and appropriate citations may be issued. In this way, a minimum number of stop arm camera systems 10 may be purchased for a fleet of busses thereby reducing the costs of identifying violators.

When in use, the stop arm camera system may capture various images of license plates of vehicles passing violating an extended stop arm of a bus. The housing containing first, second and third cameras, storage device, and communications component may be installed on a mounting plate of a desired bus prior to the bus traveling a designate route. As the bus approaches a stop along the designate route, the stop arm may be extended to stop passing traffic while passengers embark or disembark from the bus.

In one embodiment, the stop arm camera system begins recording through the three cameras and recording the images from these cameras when the stop arm is extended. For example the stop arm camera system may begin recording when a driver of the bus activates the stop arm, or a switch may be placed on the stop arm to activate the stop arm camera system when the stop arm is extended. In an alternative embodiment, the stop arm camera system may begin recording when the bus begins traveling a designated route and may continuously record until the bus completes the route. In yet another embodiment, the stop arm camera system may be configured to record an image of a license plate of a passing vehicle when the stop arm is extended based on a passing vehicle setting off a motion sensor, for example, a video motion sensor.

Figure 7:
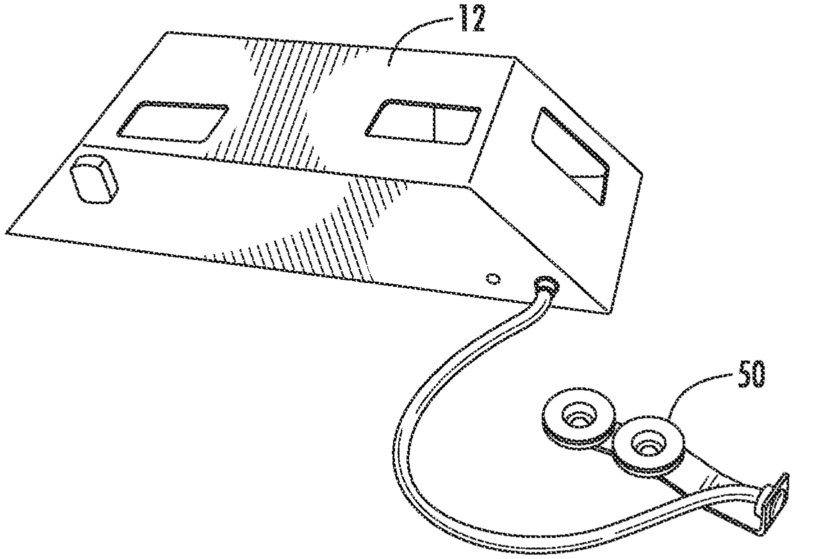
FIG. 7 is a perspective view of a stop arm camera system including a magnetic switch according to one embodiment of the present disclosure.

In some embodiments, the portable stop arm camera system 10 is initially activated by a switch 50 (FIG. 7) mounted exterior to the housing 12. The switch 50 may be a magnetic switch that is located directly adjacent the stop arm 24. A magnet may be placed on the stop arm such that when the stop arm is not extended the magnet is immediately adjacent the switch. The switch may be held in an open position when the magnet is adjacent the switch while the stop arm is not extended. When the stop arm is extended, the magnet is moved away from the switch and the switch is closed, thereby activating the stop arm camera system 10 to begin recording. In alternative embodiments, other various switches may be used such that the stop arm camera system 10 begins recording when the stop arm is extended. For example, a microswitch may be attached to the bus adjacent the stop arm so that the switch is held in an open position. When the stop arm is extended, the switch closes thereby activating the stop arm camera system 10.

Figure 8:
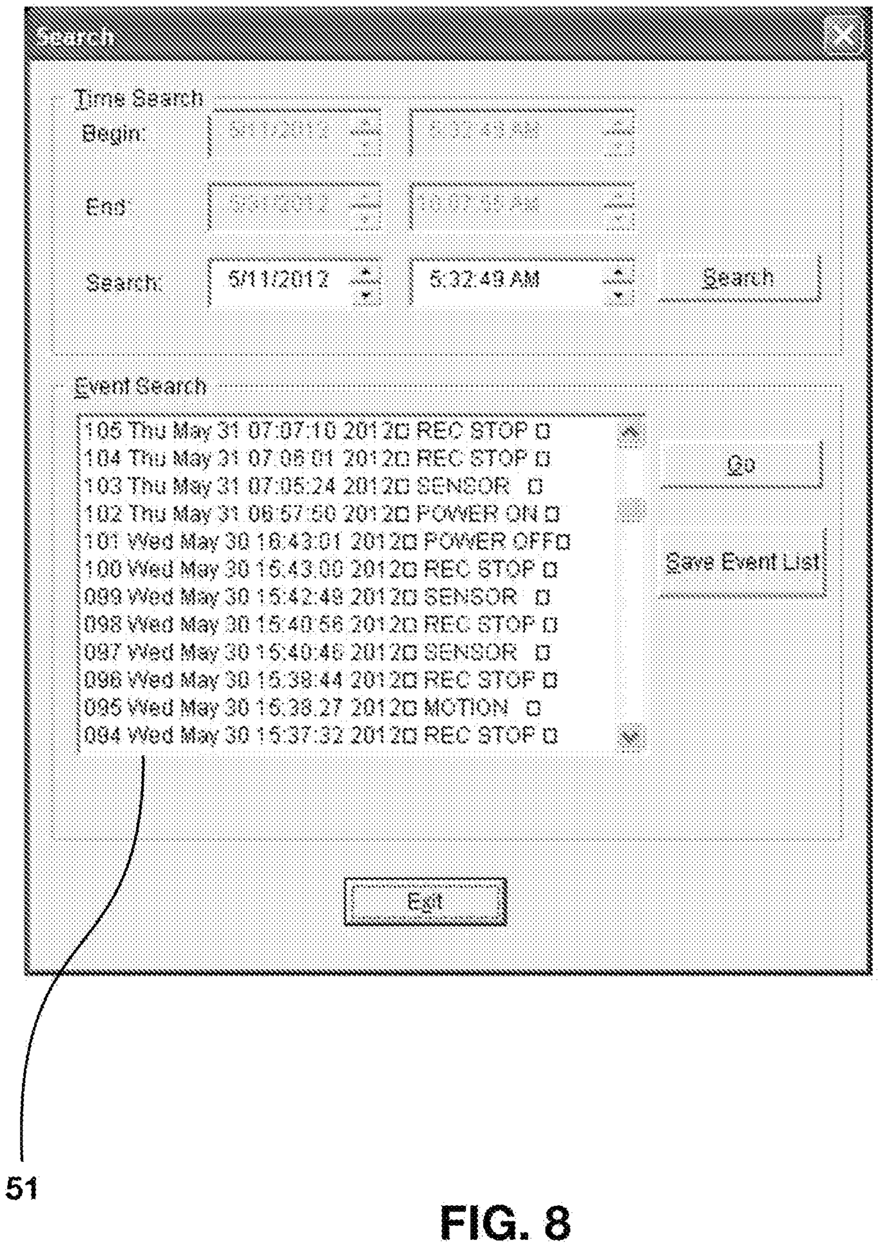
FIG. 8 is an illustration of an event list according to one embodiment of the present disclosure.

In yet another alternative embodiment, a motion sensor may be included to detect motion in one or more of the first camera, second camera, and third camera. The first camera, second camera, and third camera may be activated to record information when the stop arm of the bus is extended. If the one or more motion sensors are triggered while either of the first camera, second camera, or third camera are recording, a marker is added to the recorded information designating an event occurred corresponding to a violation of the extended stop arm. The marker may designate where within the recording a stop arm violation was detected, thereby enabling the recorded violation to be quickly located within the recorded information. The markers designating the occurrence of an event may be placed in an event list 51 in a memory location of the recording device showing the time at which the event occurred, such as the list illustrated in FIG. 8.

When a vehicle violates the stop arm and the information is recorded by the three cameras of the stop arm camera system 10, the information may then be sent to the proper authorities for issuance of a citation using a wireless communication device or the information stored on the removable memory card.

In one embodiment, at least one of the cameras of the portable stop arm camera system 10 is configured to capture a view including at least a portion of the extended stop arm 24 to show that the stop arm 24 was actually extended when the stop arm camera system 10 captured a violation.

Figure 9:
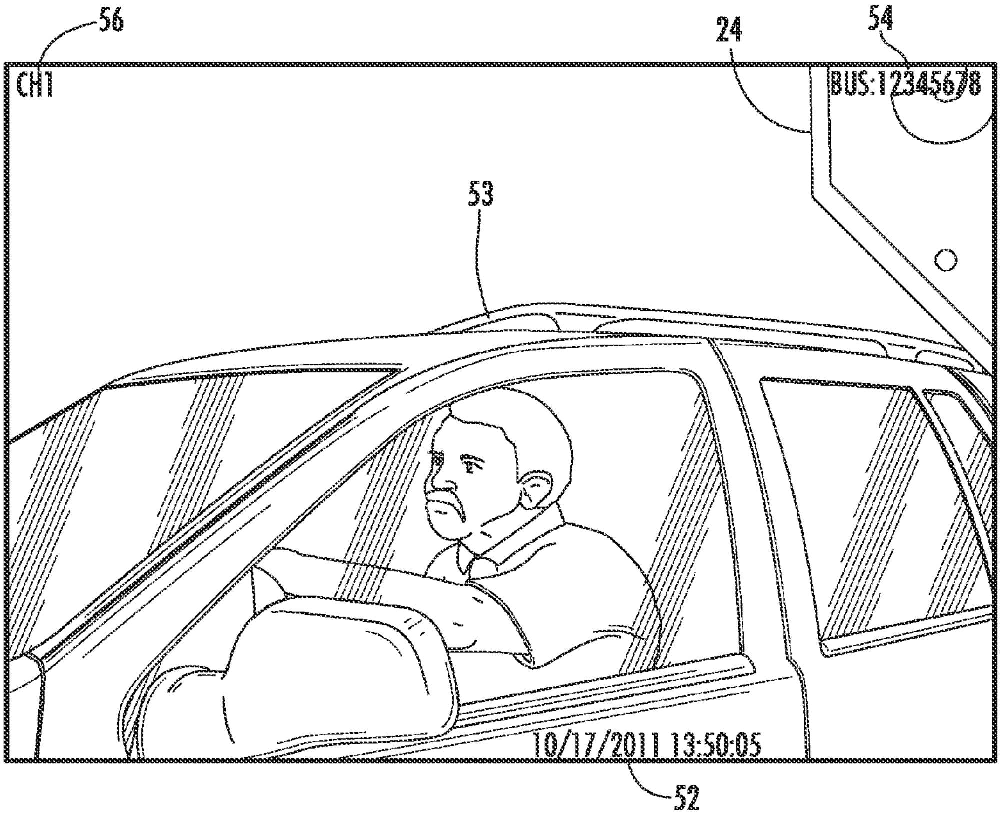
FIG. 9 is an illustration of an image captured by a stop arm camera system according to one embodiment of the present disclosure.

FIG. 9 illustrates a still image captured by the stop arm camera system 10 of a vehicle 53 failing to stop for an extended stop arm 24 according to one embodiment of the present disclosure. When each camera is activated and takes an image of a vehicle violating the stop arm, various information is recorded and stamped onto the photo including a date and time 52, a bus identifying number 54, and an indicator of which camera captured the image 56.

Figure 10:
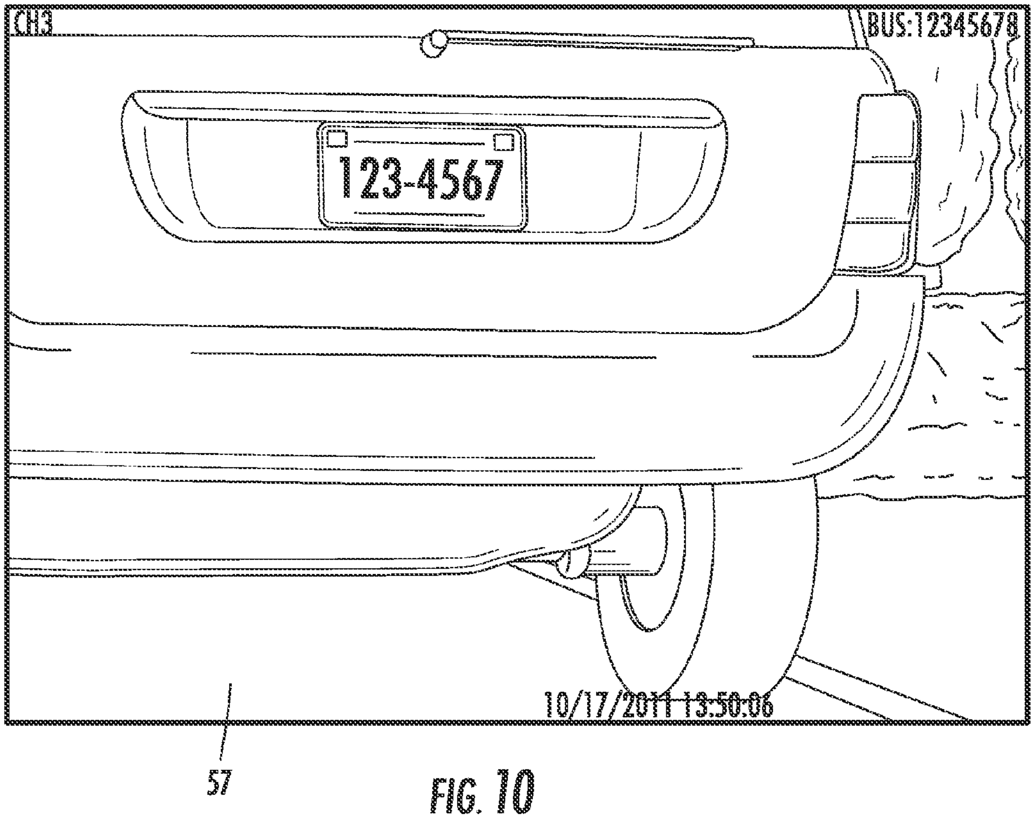
FIG. 10 is an illustration of an image of a license plate captured by a stop arm camera system according to one embodiment of the present disclosure.

FIG. 10 illustrates a rear-facing image 57 captured by a second camera 16 according to one embodiment of the present disclosure, which includes the license plate of the vehicle violating the stop arm 24 for identifying the violating vehicle.

Figure 11:
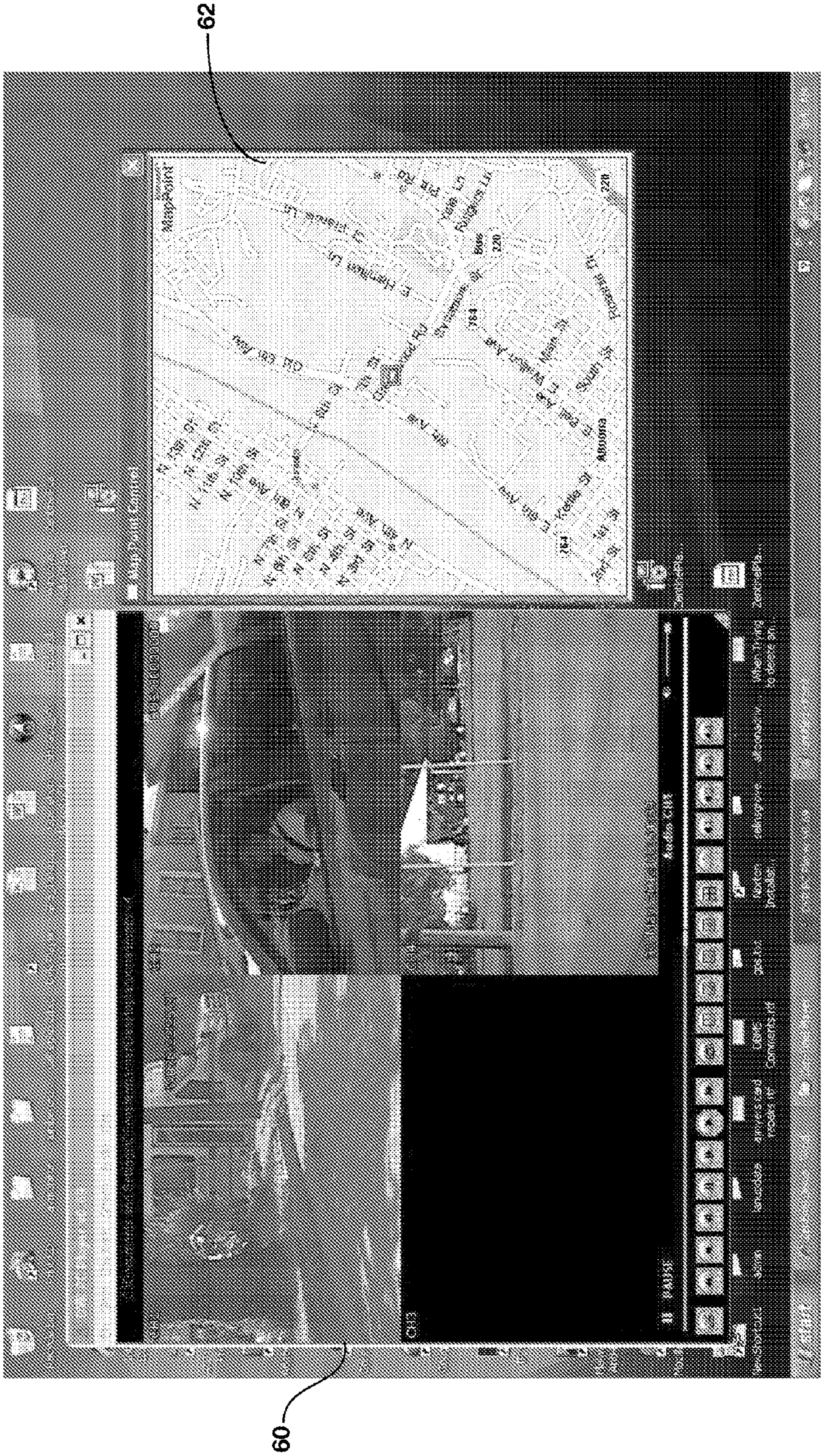
FIG. 11 is an illustration of a map and video player according to one embodiment of the present disclosure.

In yet another embodiment, a video player 60, shown in FIG. 11, may be used to show the recorded images from the stop arm camera system 10 alongside a map 62 showing the location of the bus corresponding to the recorded images from the camera system 10. When video recorded by the stop arm camera system is viewed, the map shows the location of the bus along its route corresponding to the image being shown. The location information is based on information recorded by the GPS unit 28 of the stop arm camera system 10.

The communications component 26 is configured to wirelessly transmit information captured by the stop arm camera system 10 to a central database via a cellular network. Alternatively, the communications component 26 is configured to wirelessly transmit information via, other wireless connections, such as WiFi. In this embodiment, the information captured on the portable stop arm camera system 10 may be viewed by anyone with access to the central database, thereby enabling the information to be immediately reviewed without waiting for the bus to return from its current route. In another embodiment, the information recorded by the stop arm camera system 10 may be transmitted to a central database that is accessible by a computer terminal using a username and password. In other embodiments, the information may be transmitted to a cloud-based data storage system for access by authorized persons for issuing citations or other actions.

The previously described embodiments of the present disclosure have many advantages. The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention.

What is claimed is:

1. A school bus camera system comprising:

a portable camera unit comprising a housing, a base plate attached to the housing, the portable camera system containing:

at least a first camera for capturing an image of a license plate of a vehicle passing the school bus;

a storage device for recording images from the first camera; and a power source for operating the camera and storage device, a system activation device in electrical communication with components in the housing, and a mounting plate separable from the portable camera unit for removably attaching the portable camera unit to a side of a school bus, (iii) wherein the mounting plate is fixedly attached to the school bus, and the portable camera unit is removably attached to the mounting plate.

2. The system of claim 1 wherein the first camera captures an image of a license plate of a vehicle passing from the front of the bus, further comprising a second camera for capturing an image of a license plate of a vehicle passing from the back of the bus, and a third camera for capturing an image of a driver of at least one of the vehicle passing from the front of the bus and the vehicle passing from the back of the bus, wherein at least one of the first, second and third cameras also captures at least a portion of an extended stop arm of the bus.

3. The system of claim 2, wherein the system activation device comprises a camera(s) activation device, wherein the first, second and third cameras begin recording when the stop arm of the bus is extended.

4. The system of claim 3 further comprising a motion sensor for creating an event indicating when the first, second and third cameras record a vehicle passing the school bus while the stop arm is extended.

5. The system of claim 1 wherein the first camera captures an image of a license plate of a vehicle passing from the front of the bus and portion of an extended stop arm of the school bus.

6. The system of claim 1, further comprising a GPS unit for recording the location of the school bus when the first, second and third cameras capture images.

7. The system of claim 1, further comprising an access door on a side portion of the housing for removing the storage device to retrieve images recorded by the school bus camera system and for accessing a power source of the school bus camera system.

8. The system of claim 1, further comprising a power source for powering the system, wherein the power source is independent from and not in electrical communication with the school bus, the power source being selected from the group consisting of a rechargeable battery, a solar power source, and combinations thereof.

9. The system of claim 1 further comprising a power cable in electrical communication with the school bus wherein the school bus camera system is powered by the school bus.

10. The system of claim 1, wherein the base plate and mounting plate contain a locking device for securing the base plate of the system to the mounting plate.

11. The system of claim 10, wherein the base plate is slidably engaged with the mounting plate.

12. The system of claim 10, wherein the base plate is rotatively engaged with the mounting plate.

13. The system of claim 1, wherein the mounting plate is magnetically attached to a side portion of the school bus.

14. A method for attaching a camera system to a school bus, wherein the camera system comprises (a) a mounting plate containing engaging means and locking means, (b) a portable camera unit comprising a housing and a base plate for engaging the engaging means and locking means of the mounting plate, the portable camera unit containing one or more cameras for recording stop arm violations, and (c) an activation means for activating the camera system, the method comprising fixedly attaching the mounting plate to a school bus;

removably attaching the portable camera unit to the mounting plate and;

locking the portable camera unit onto the mounting plate.

15. The method of claim 14, wherein the activation means comprises a magnetic switch for activating the first, second and third cameras of the camera system when a vehicle passes the stop arm while the stop arm is extended.

16. The method of claim 15 further comprising a motion sensor for creating an event indicating when the first, second and third cameras record a vehicle passing the school bus while the stop arm is extended.

17. The method of claim 16, wherein the camera system comprises a GPS unit for recording the location of the school bus when the first, second and third cameras capture images.

18. The method of claim 14, wherein the housing comprises an access door on a side portion of the housing for removing a storage means in the housing.

19. The method of claim 14, wherein the system comprises power means for powering the system, wherein the power means is independent from and not in electrical communication with the school bus, the power means being selected from the group consisting of a rechargeable battery, a solar power source, and combinations thereof.

20. The method of claim 14, wherein the camera system is removably attached to the mounting plate by slidably engaging the base plate with the mounting plate.

21. The method of claim 14, wherein the base plate is removably attached to the mounting plate by rotatively engaging the base plate with the mounting plate.

22. The system of claim 9, wherein the power cable in electrical communication with the school bus comprises a plug and receiver for removably securing the power cable to the camera system.

23. The method of claim 14 wherein the activation means is in electrical communication with the school bus such that the camera system is activated when the stop arm is extended.

24. The method of claim 16 wherein the event recorded by the first, second and third is wireless transmitted to a central database when the event is detected.

* * * * *